(12) United States Patent
Yang

(10) Patent No.: US 6,406,163 B1
(45) Date of Patent: Jun. 18, 2002

(54) SOLAR CELL LIGHTING FIXTURE INTEGRATED WITH HEAT SINK

(76) Inventor: Tai-Her Yang, No. 59, Chung Hsing 8 St., Si-Hu Town, Dzan-Hwa (TW)

( * ) Notice: Subject to any disclaimer, the term of this patent is extended or adjusted under 35 U.S.C. 154(b) by 0 days.

(21) Appl. No.: 09/721,970

(22) Filed: Nov. 27, 2000

(51) Int. Cl.[7] ............................ F21L 4/02; F21V 23/00
(52) U.S. Cl. ...................... 362/183; 362/374; 362/276
(58) Field of Search ........................... 362/183, 218, 362/191, 249, 276, 363, 306, 360, 361, 353, 354, 294, 373

(56) References Cited

U.S. PATENT DOCUMENTS

| | | | |
|---|---|---|---|
| 5,103,384 A | * 4/1992 | Drohan | 362/191 |
| 5,249,112 A | * 9/1993 | Bray | 362/306 |
| 5,297,013 A | * 3/1994 | Hall et al. | 362/363 |
| 6,120,165 A | * 9/2000 | Shalvi | 362/276 |

* cited by examiner

Primary Examiner—Alan Cariaso
Assistant Examiner—Bao Truong
(74) Attorney, Agent, or Firm—Bacon & Thomas

(57) ABSTRACT

A solar cell lighting fixture is integrated with a heat sink adapted to a lantern, a garden light, a wall fitting, a portable lighting fixture or other lighting fixtures, or on a mobile vehicle including an automobile, a sea vessel, an aircraft, a bicycle, or a motorcycle. A support structure with a predetermined configuration is provided between an upper lid with a solar cell panel, and a bulb is provided below the upper lid. A bulb housing contains battery components, such as a secondary cell or a battery capacitor, a charging circuit or a component to convert electrical energy into optical energy, and operation and control circuits. The support structure defines a space for the heat sink, thus allowing heat dissipation for the area between the upper lid and the bulb, thus protecting the charging circuit and battery components contained inside the bulb housing from being damaged or having their performance negatively affected by heat built up due to prolonged exposure to the direct sun.

13 Claims, 15 Drawing Sheets

SOLAR CELL LIGHTING FIXTURE INTEGRATED WITH HEAT SINK

BACKGROUND OF THE INVENTION (a) Field of the Invention

The present invention relates to a solar cell lighting fixture integrated with a heat sink, and more particularly, to one to be adapted to a wall fitting or a garden light. Between its utmost top where an upper lid of a solar cell panel is provide, and below the top where a bulb containing battery components and other circuit devices, a ventilation space and a support structure of a predetermined configuration in said space are provided. An isolated heat sink between the upper lid and the bulb is created for protecting the charging circuits and its battery components from being damaged or their performance from been negatively affected by excessively high interior temperature due to prolonged direct sunshine.

(b) Description of the Prior Art

The prior art of solar lighting fixture, such as a traditional solar cell post lantern, garden light or wall fitting is essentially comprised of a solar cell panel light shade, bulb, battery components within the bulb (containing charging circuit and battery and a mounting member. The purpose of said mounting member is for the fixture to be either directly buried in the ground, or provided at the top of a post, in a mechanical equipment, or to a vehicle including a automobile, a sea vessel or an aircraft. Said member may be also provided in a form of an underground post or ground tapered support. However, in the traditional solar cell lighting fixture, the light shade of the solar cell panel and the bulb are integrated that encourages heat to build up inside the bulb due to hyperthermal effect when the solar cell panel absorbs solar energy. Since the heat can not be effectively dissipated, the performance of the charging circuit and cell components is vulnerable to damage or failure.

SUMMARY OF THE INVENTION

The primary purpose of the present invention is to provide a solar cell lighting fixture integrated with a heat sink. The prevent invention is for adaptation to a post lantern, a garden light, a wall fitting, or a vehicle including an automobile, a sea vessel or a aircraft, or a bicycle, a motorcycle, a portable light or other types of lighting fixtures. A ventilation space is provided between utmost top and bulb of the lighting fixture of the present invention. The utmost top of the lighting fixture accommodates an upper lid of a solar cell panel. Battery components such as a secondary cell or a battery capacitor, and a charging circuit or device to convert electric energy into optical energy such as a bulb or an illuminating diode and its operation and control circuits are provided below the upper lid. Within the ventilation space separating a support structure of the solar cell panel from the bulb, the support structure in a predetermined configuration is provided to protect charging circuit and its batter components from being damaged or having their performance negatively affected by excessively high interior temperature in the bulb.

Another purpose of the present invention is to provide a solar cell lighting fixture integrated with a heat sink. Said heat sink is comprised of one or more than one support pillar provided between the support structure of the solar cell panel and the bulb. Said pillars may be made mobile and mutually interlocked between the support structure of the solar cell panel and the bulb to adjust the angle of the support structure as desired. Said pillar may be individually provided onto a ring that is inserted to the bulb so that the pillar can be adjusted as desired by rotation. A universal ball joint may be provided at the bottom of the support casing of the solar cell panel and inserted into the joint pillar corresponding to the bulb for adjustment as desired by rotation. The heat sink may be also provided in net or porous structure.

DETAILED DESCRIPTION OF THE PREFERRED EMBODIMENTS

Figure 1:
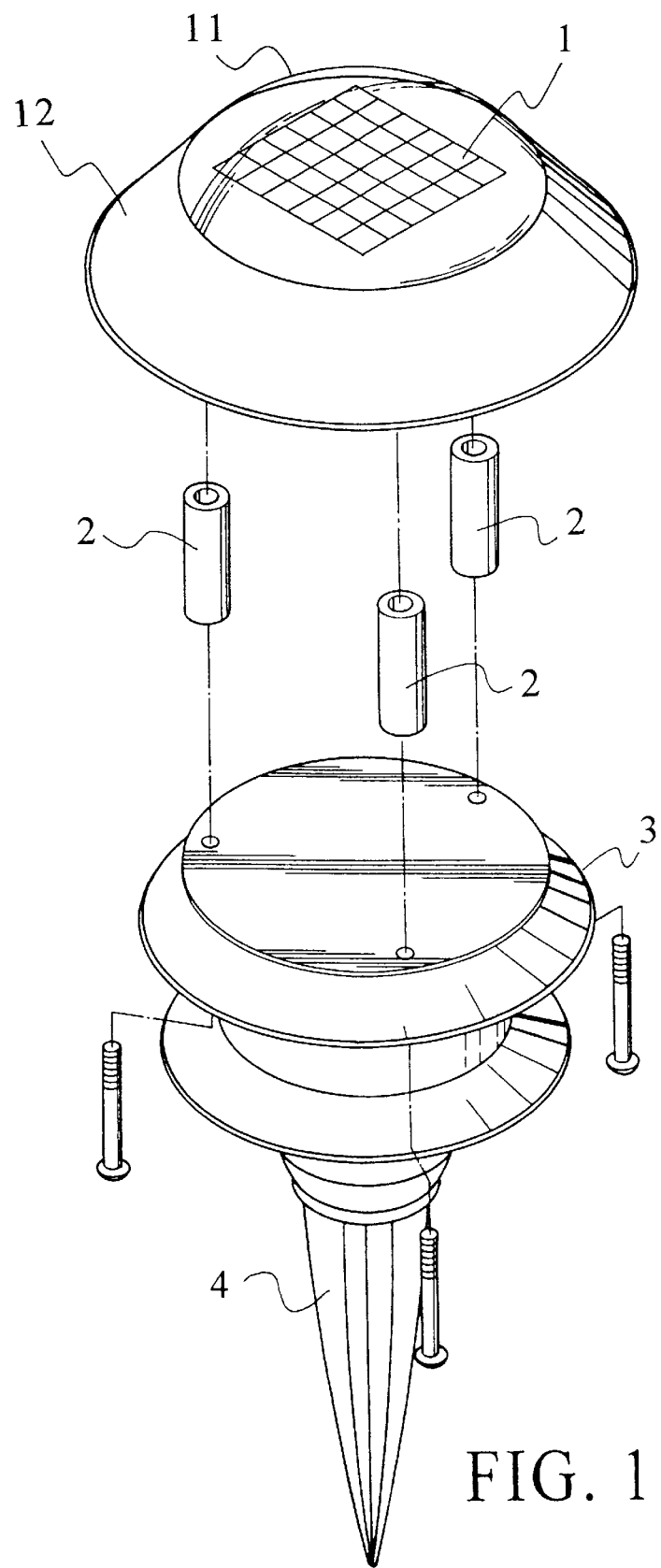
FIG. 1 is a blowout of a first preferred embodiment of the present invention.
Figure 2:
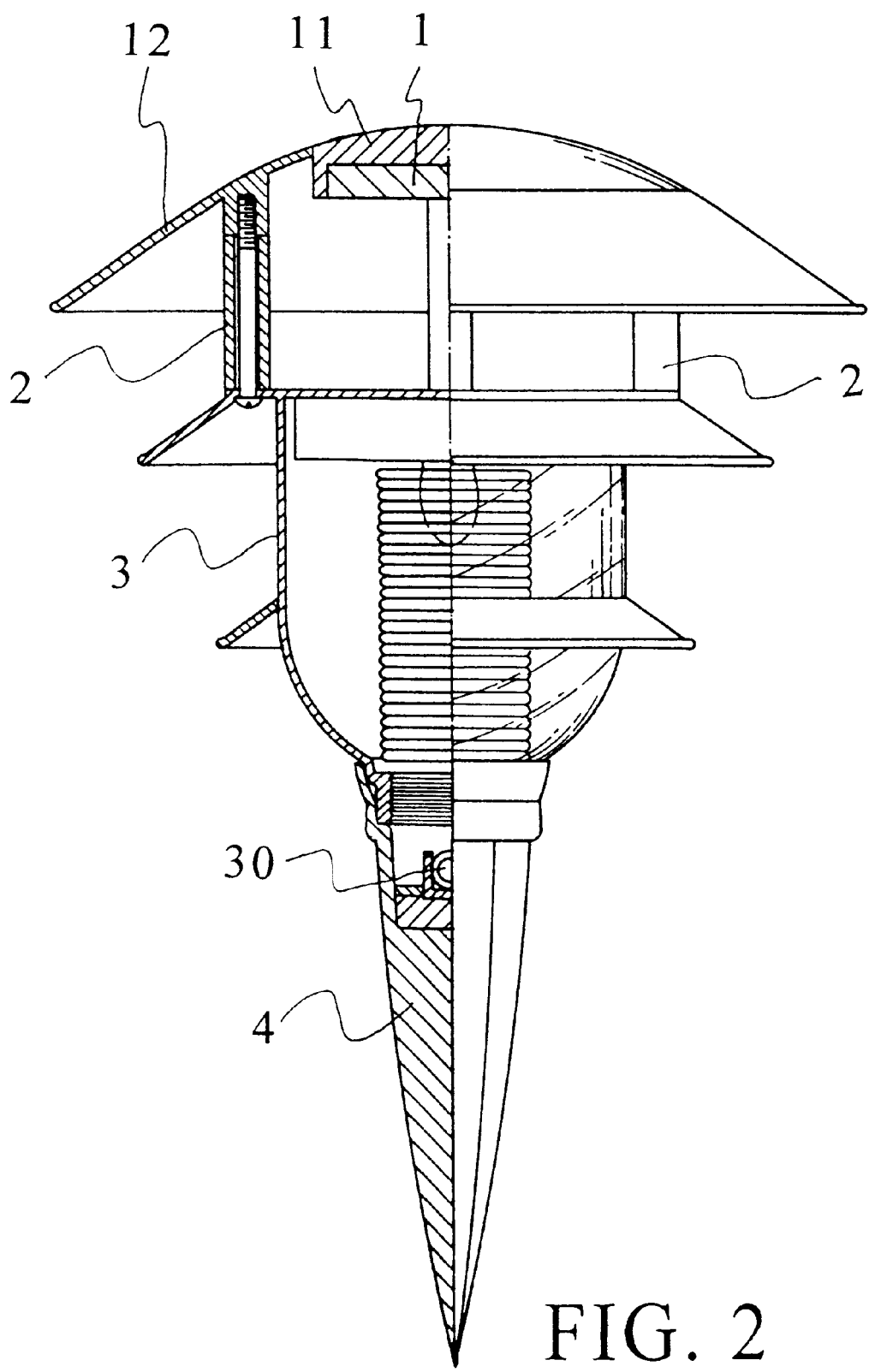
FIG. 2 is a sectional view of the first preferred embodiment of the present invention as assembled.
Figure 3:
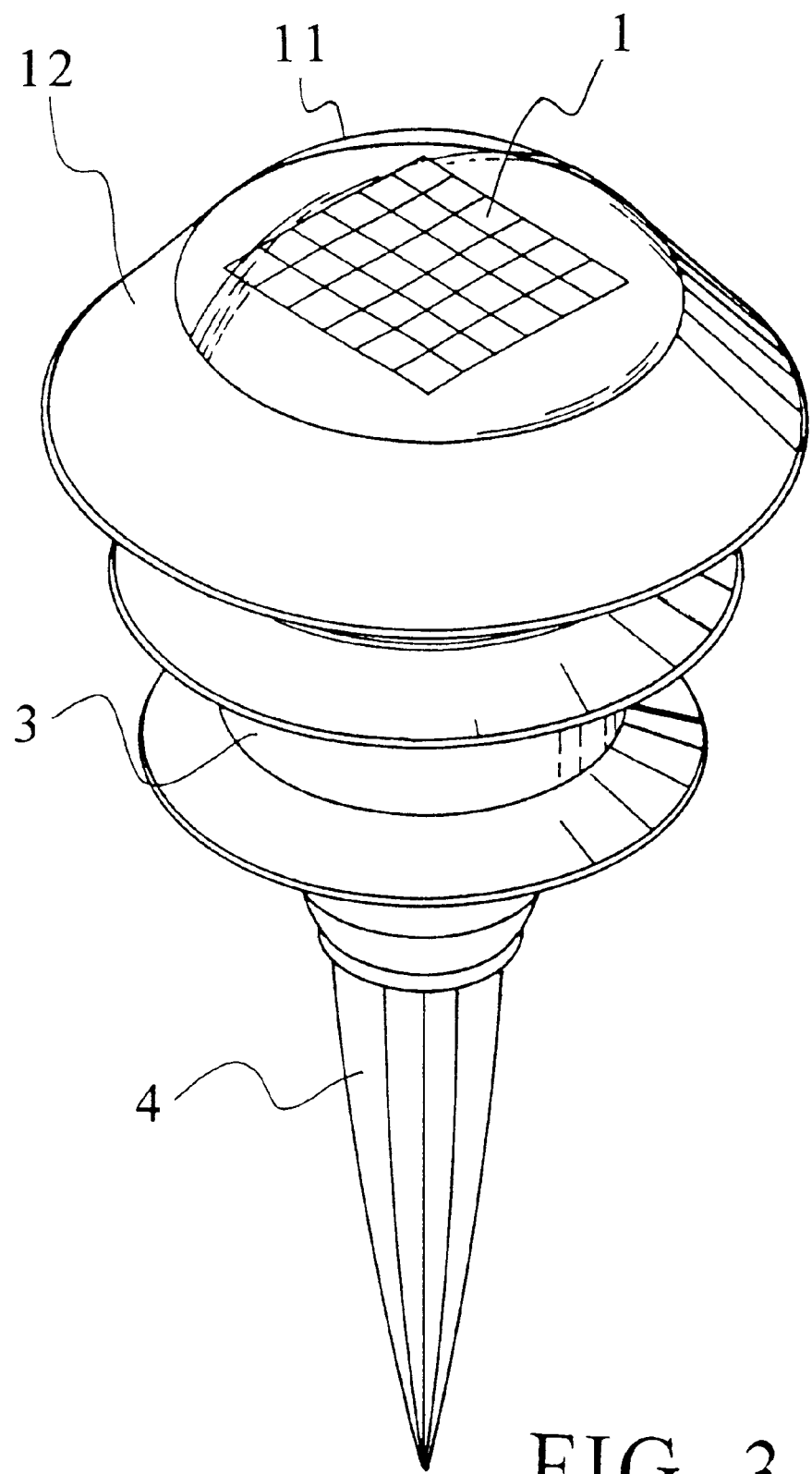
FIG. 3 is a view showing the appearance of the first preferred embodiment as assembled.

The present invention, as illustrated by multiple preferred embodiments of the accompanying drawings, is for adaptation to a post lantern, a garden light, a wall fitting or other types of lighting fixtures. It is essentially comprised of an upper lid at the utmost top to accommodate a solar cell panel, and a support structure with a predetermined configuration provided between the upper lid for accommodation of the solar cell panel and the bulb underneath said upper lid. Said support structure thus creates an isolated space for heat sink. Both of the support structure and the heat sink protect batter components inside the bulb from being damaged or having their performance negatively affected by heat build up due to prolonged exposure to direct sun. As illustrated in FIGS. 1, 2 and 3, a first preferred embodiment of the present invention of a solar lighting fixture integrated with a heat sink is essentially comprised of a solar cell panel 1, a support structure and bulb 3. Wherein, said solar cell panel 1 is provided at the tip of the utmost top of the lighting fixture and a light transmission plate 11 coupled to the solar cell panel 1 and incorporated to the upper lid 12. A support structure is fixed by incorporation or assembly between the solar cell panel 1 and a bulb 3 with one or more than one hollow or solid pillar 2 to permit an isolated heat sink between the solar cell panel 1 and the bulb 3. The bulb 3 is essentially provided to accommodate a battery component, such as a secondary cell or a battery capacitor 30. It may be further placed with a charging circuit or device that converts electrical energy into optical energy, such an electric bulb or an illuminating diode, and light operation and control circuits as applicable. The bulb 3 may be made with a tapered footing structure 4 extending downward for the lighting fixture to be directly planted into the ground. The tapered footing structure 4 provides an interior space closer to the ground for accommodating the battery component, such as the secondary cell or the battery capacitor 30, and the charging circuit or device that converts electrical energy into optical energy, such an electric bulb or an illuminating diode. Or, a tapered footing member may be separately provided at bottom of the bulb 3.

By assembling those members disclosed above, a heat sink is formed among the support structure of the solar cell panel, the bulb and the operation and control circuits. By taking advantage of said isolated heat sink, the charging circuit and its battery component 30 inside the bulb 3 are protected from being damaged or having their performance negatively affected by excessively heat built up due to the prolonged direct sunshine.

Figure 4:
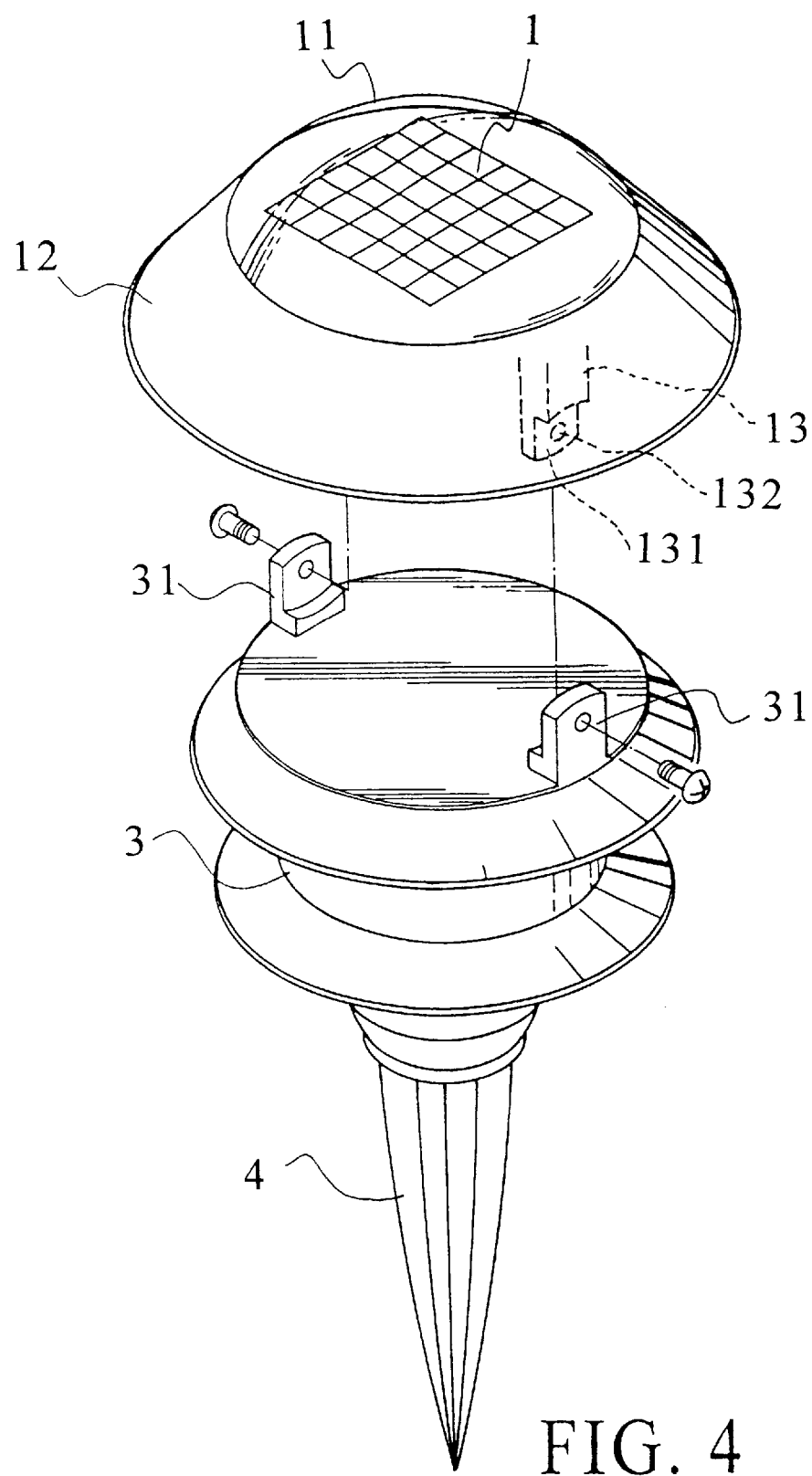
FIG. 4 is a blowout of a second preferred embodiment of the present invention.
Figure 5:
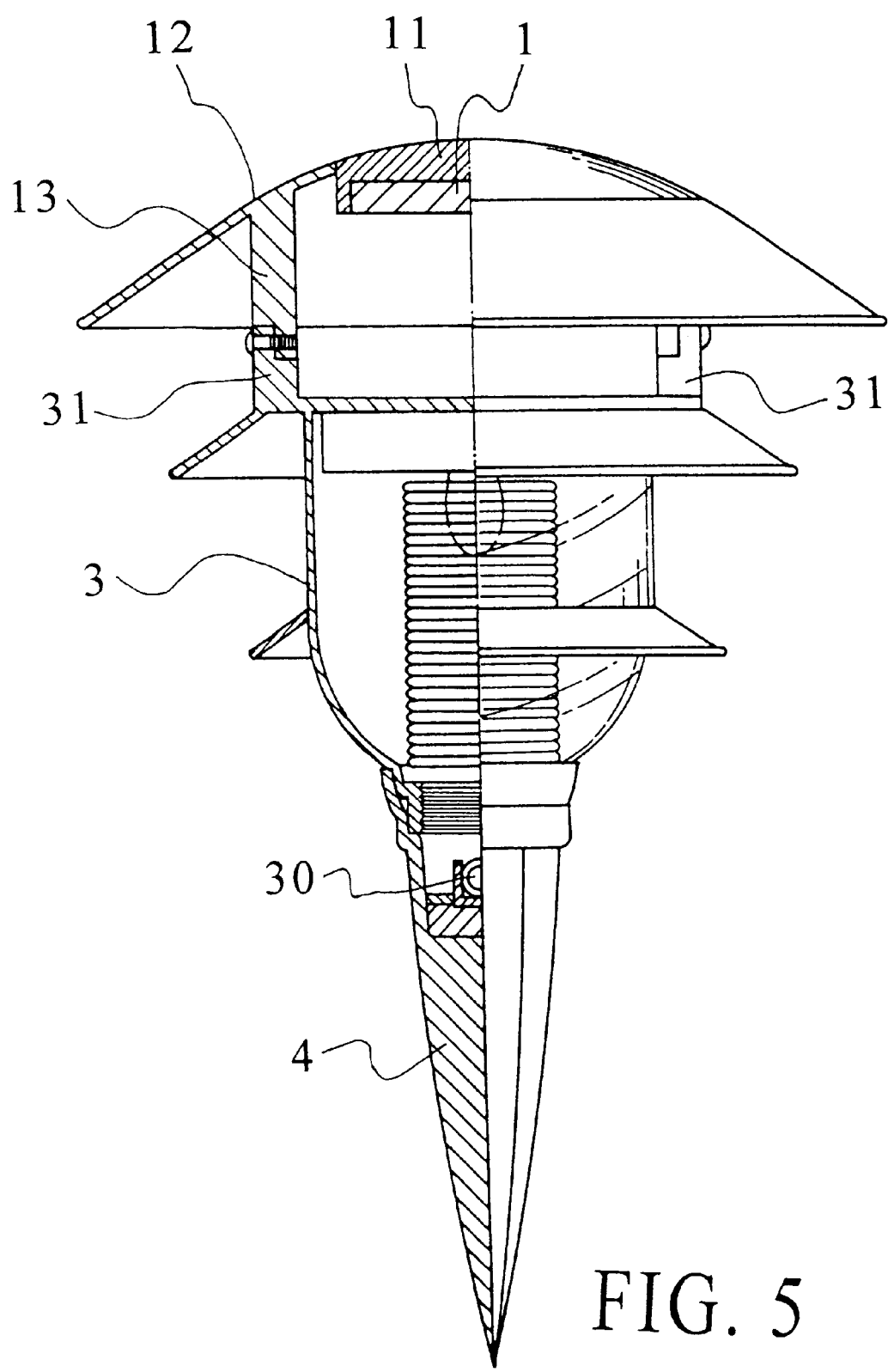
FIG. 5 is a sectional view of the second preferred embodiment of the present invention as assembled.

As illustrated in FIGS. 4 and 5, a second preferred embodiment of the present invention of a solar cell lighting fixture integrated with a heat a sink is essentially comprised of a solar cell panel 1, a support structure and a bulb 3. Wherein, said solar cell panel 1 is provided at the utmost top of the lighting fixture. A light transmission 11 is coupled to the peripheral of the solar cell panel 1 and incorporated to an upper lid 12. An insertion post 13 is each provided at where appropriately on both sides of at the bottom of the upper lid 12, and a graded arc 131 and a pivot hole 132 are provided at the terminal of each insertion post 13. In the support structure, one locking post 31 is each provided at the where appropriately on both sides of the upper end of the bulb 3. The upper end of said locking post 31 indicates an arc so to pivot to the insertion post 13. Both of the insertion post 13 and the locking 31 when pivoted define for the solar cell panel 1 an isolated heat sink between said support structure and the bulb 3. The solar cell panel 1 on the upper lid 12 can also be adjusted for the optimal area to contact the sunlight as desired. The bulb 3 is essentially provided for accommodation battery component 30, such as a secondary cell or battery capacitor. If required, a charging circuit or a component to convert electrical energy into optical energy, such as an electric bulb or an illuminating diode and light operation and control circuits. The bulb 3 may further include a tapered footing structure 4 extending downward from the bulb 3 for the lighting fixture to be directly planted into the ground. The footing structure 4 also provides an interior space closer to the ground to accommodate the battery component, such as a secondary cell or a battery capacitor 30. Furthermore, as required, a charging circuit or a component to convert electrical energy into optical energy such as an electric bulb or an illuminating diode may also be included in the interior space. Alternatively, the tapered footing member to plant the lighting fixture may be separately provided at the bottom of the bulb 3.

Those members disclosed above for the second preferred embodiment of the present invention when assembled create a space between the support structure for the solar cell panel support structure and the operation and control circuits for heat sink. The angle facing the sunlight for the solar cell panel 1 can be adjusted as desired. By taking advantage of the heat sink, the charging circuit and its battery component 30 in the bulb 3 are protected from being damaged or having their performance negatively affected by the heat built up due to prolonged exposure to the direct sunshine.

Figure 6:
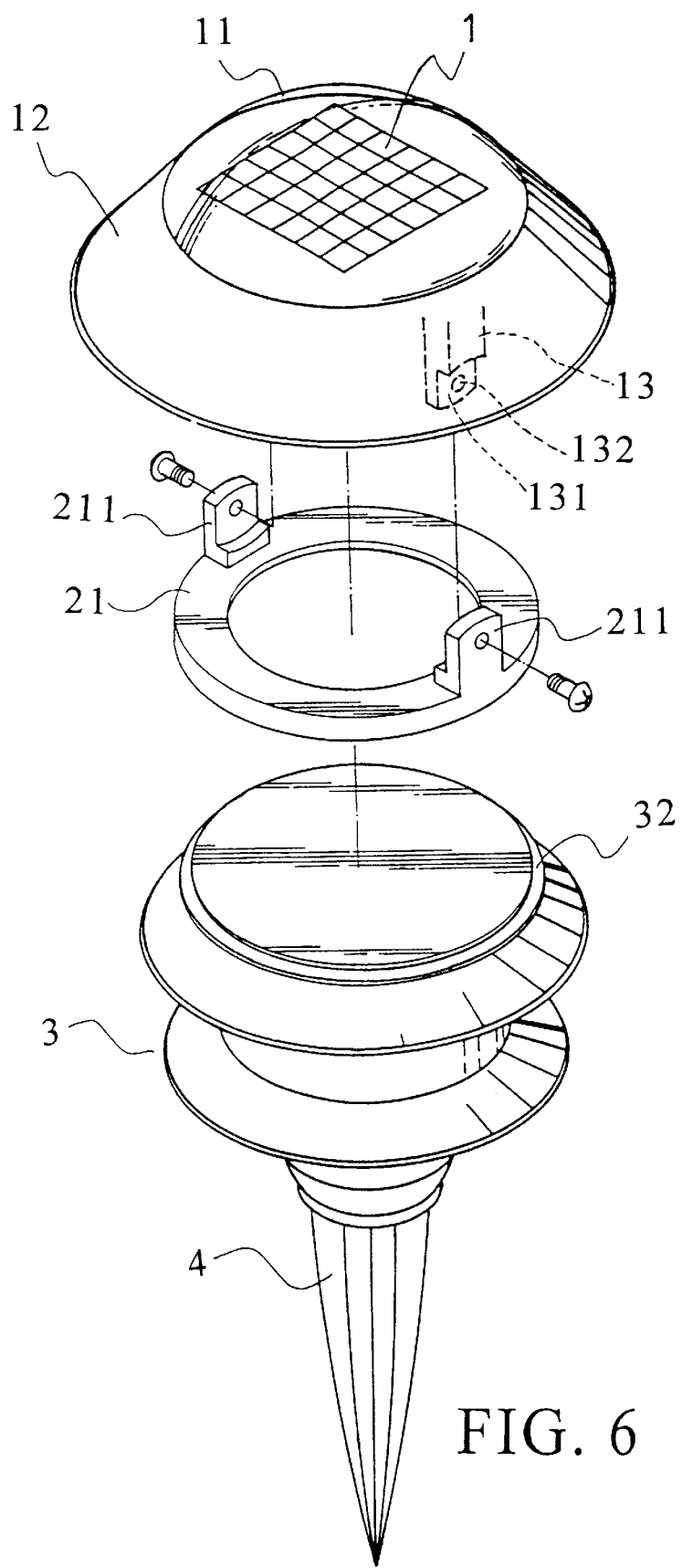
FIG. 6 is a blowout of a third preferred embodiment of the present invention.
Figure 7:
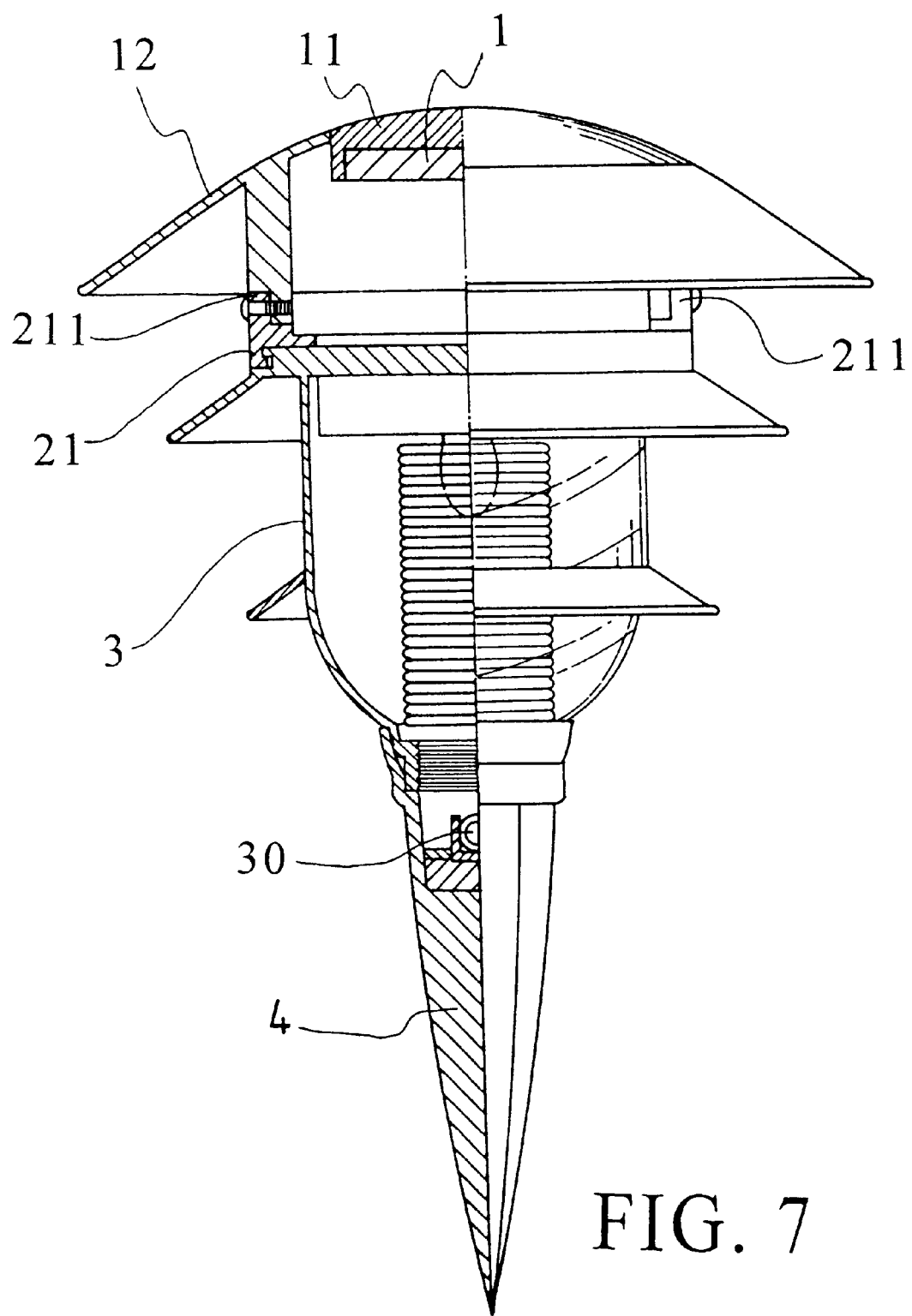
FIG. 7 is a sectional view of the third preferred embodiment of the present invention as assembled.

Referring to those preferred embodiments disclosed above and FIGS. 6 and 7, in a third preferred embodiment of the present invention of a solar cell lighting fixture integrated with a heat sink, the locking post of the support structure is separately provided to a ring component 21. A groove 32 in relation to the locking post is provided at the upper edge of the bulb 3. A locking post 211 provided on the ring component 21 is pivoted to the insertion post 13 provided under the solar cell panel 1. Accordingly, the solar cell panel is able to freely rotate by means of said ring component 21 to adjust elevation of the isolated heat sink, and an adjusting effect by radius oriented rotation. The bulb 3 may further include a tapered footing structure 4 extending downward from the bulb 3 for the lighting fixture to be directly planted into the ground. The footing structure 4 also provides an interior space closer to the ground to accommodate the battery component, such as a secondary cell or a battery capacitor 30. Furthermore, as required, a charging circuit or a component to convert electrical energy into optical energy such as an electric bulb or an illuminating diode may also be included in the interior space. Alternatively, the tapered footing member to plant the lighting fixture may be separately provided at the bottom of the bulb 3.

Figure 8:
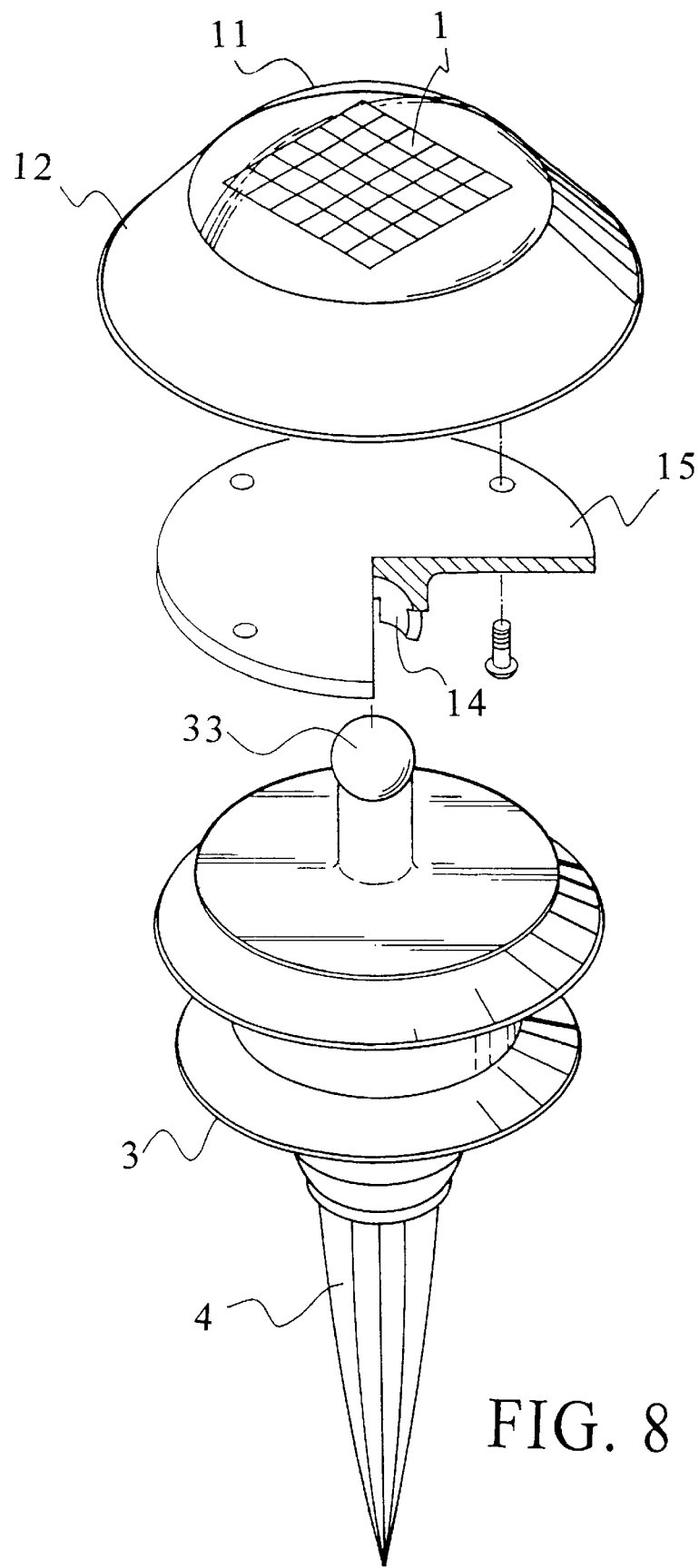
FIG. 8 is a blowout of a fourth preferred embodiment of the present invention.
Figure 9:
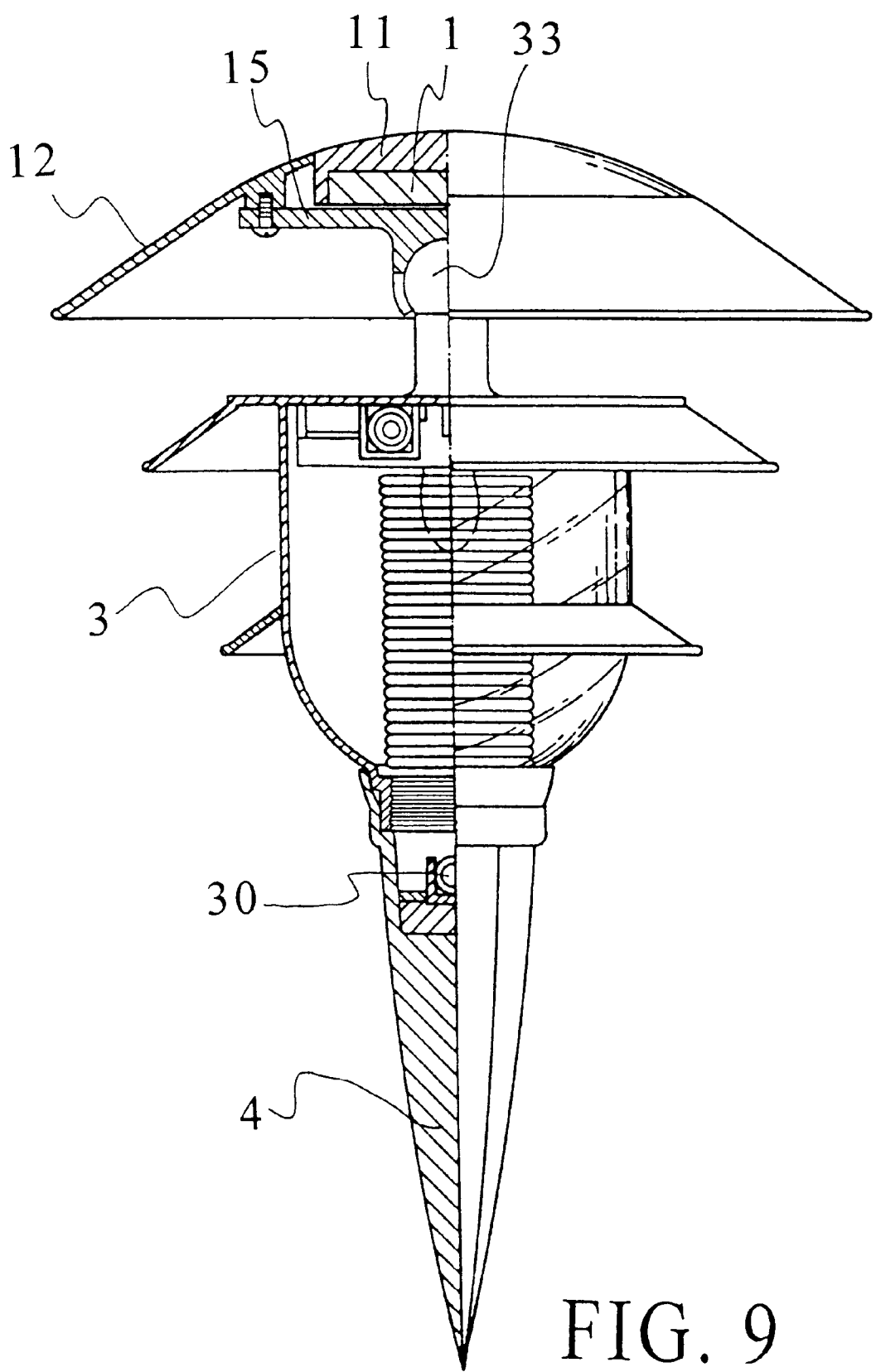
FIG. 9 is a sectional view of the fourth preferred embodiment of the present invention as assembled.

In relation to the support structure disclosed in the preferred embodiments above, a structure of universal ball point 14 is provided at a lower casing 15 of the solar cell panel 1 in a fourth preferred embodiment of the present invention as illustrated in FIGS. 8 and 9. Said ball joint 14 is given with a proper packing structure to rotate a corresponding ball pillar 33 freely inserted into the upper end of the bulb 3. The bulb 3 may further include a tapered footing structure 4 extending downward from the bulb 3 for the lighting fixture to be directly planted into the ground. The footing structure 4 also provides an interior space closer to the ground to accommodate the battery component, such as a secondary cell or a battery capacitor 30. Furthermore, as required, a charging circuit or a component to convert electrical energy into optical energy such as an electric bulb or an illuminating diode may also be included in the interior space. Alternatively, the tapered footing member to plant the lighting fixture may be separately provided at the bottom of the bulb 3.

Figure 10:
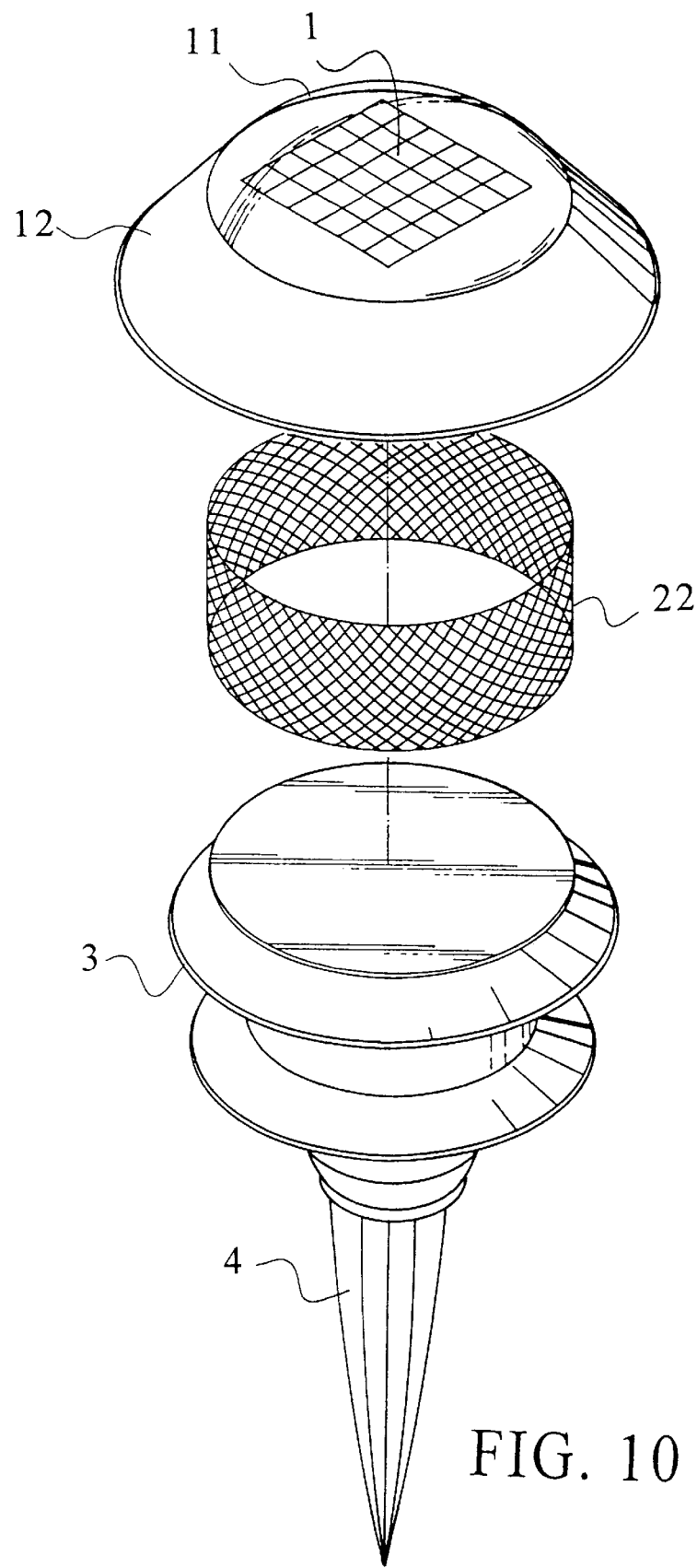
FIG. 10 is a blowout of a fifth preferred embodiment of the present invention.
Figure 11:
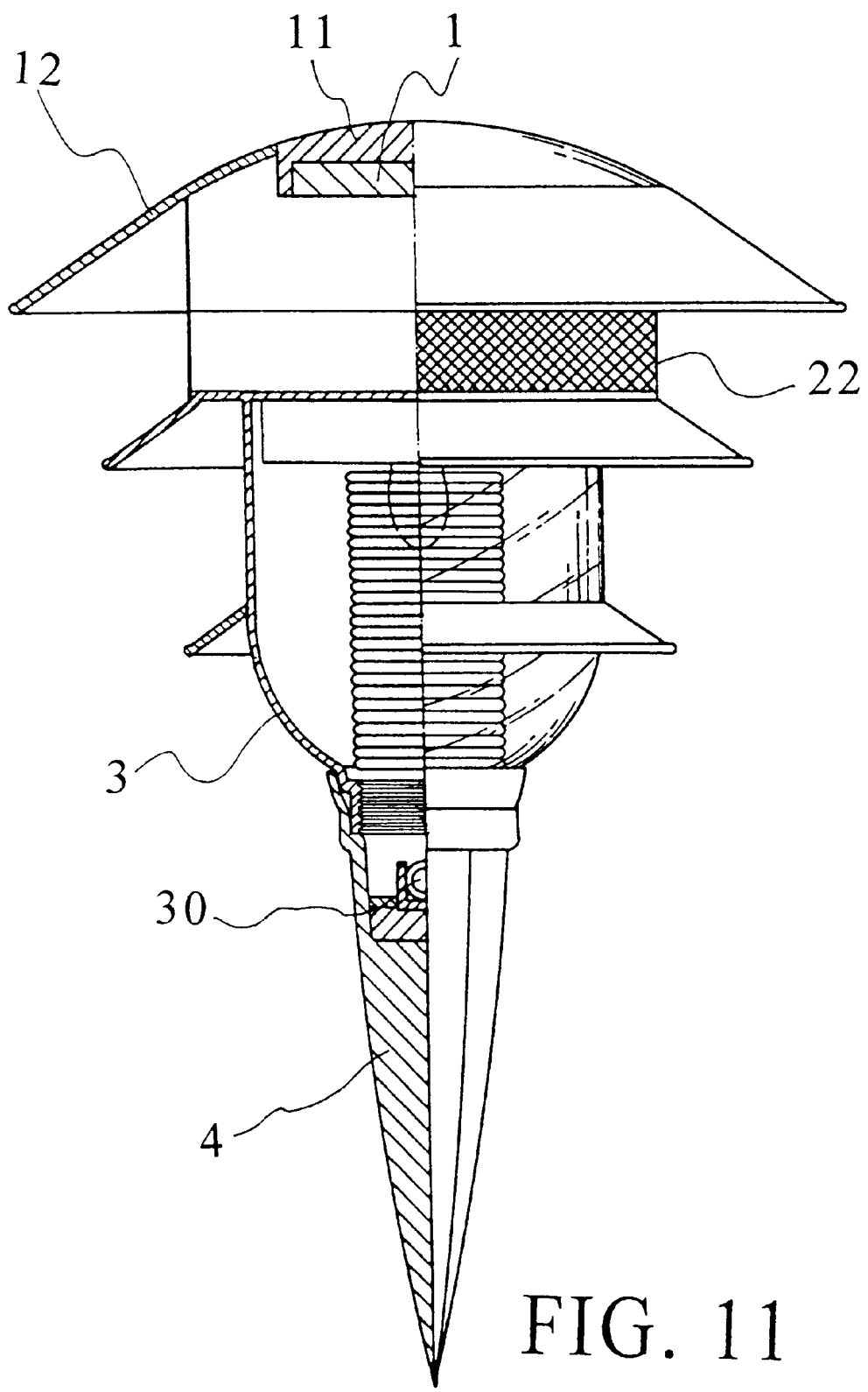
FIG. 11 is a sectional view of the fifth preferred embodiment of the present invention as assembled.

In relation to the support structure disclosed in the preferred embodiments above, a net or porous support structure 22 is provided between the solar cell panel 1 and the bulb 3 to create a heat sink in a fifth preferred embodiment of the present invention as illustrated in FIGS. 10 and 11. Said ball joint 14 is given with a proper packing structure to rotate a corresponding ball pillar 33 freely inserted into the upper end of the bulb 3. The bulb 3 may further include a tapered footing structure 4 extending downward from the bulb 3 for the lighting fixture to be directly planted into the ground. The footing structure 4 also provides an interior space closer to the ground to accommodate the battery component, such as a secondary cell or a battery capacitor 30. Furthermore, as required, a charging circuit or a component to convert electrical energy into optical energy such as an electric bulb or an illuminating diode may also be included in the interior space. Alternatively, the tapered footing member to plant the lighting fixture may be separately provided at the bottom of the bulb 3.

Figure 12:
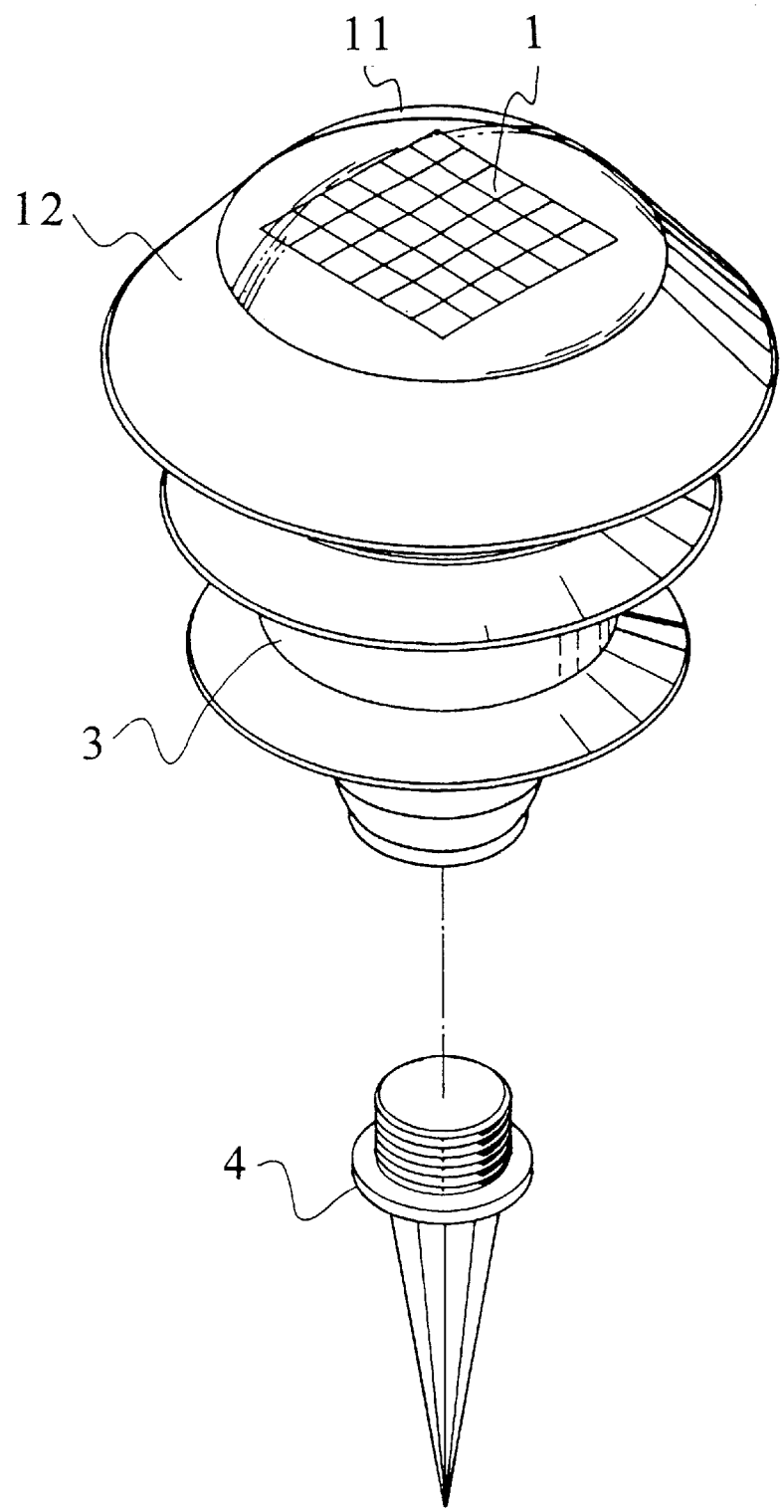
FIG. 12 is a view showing a preferred embodiment of the present invention with one tapered pillar provided at the bottom of a bulb.
Figure 13:
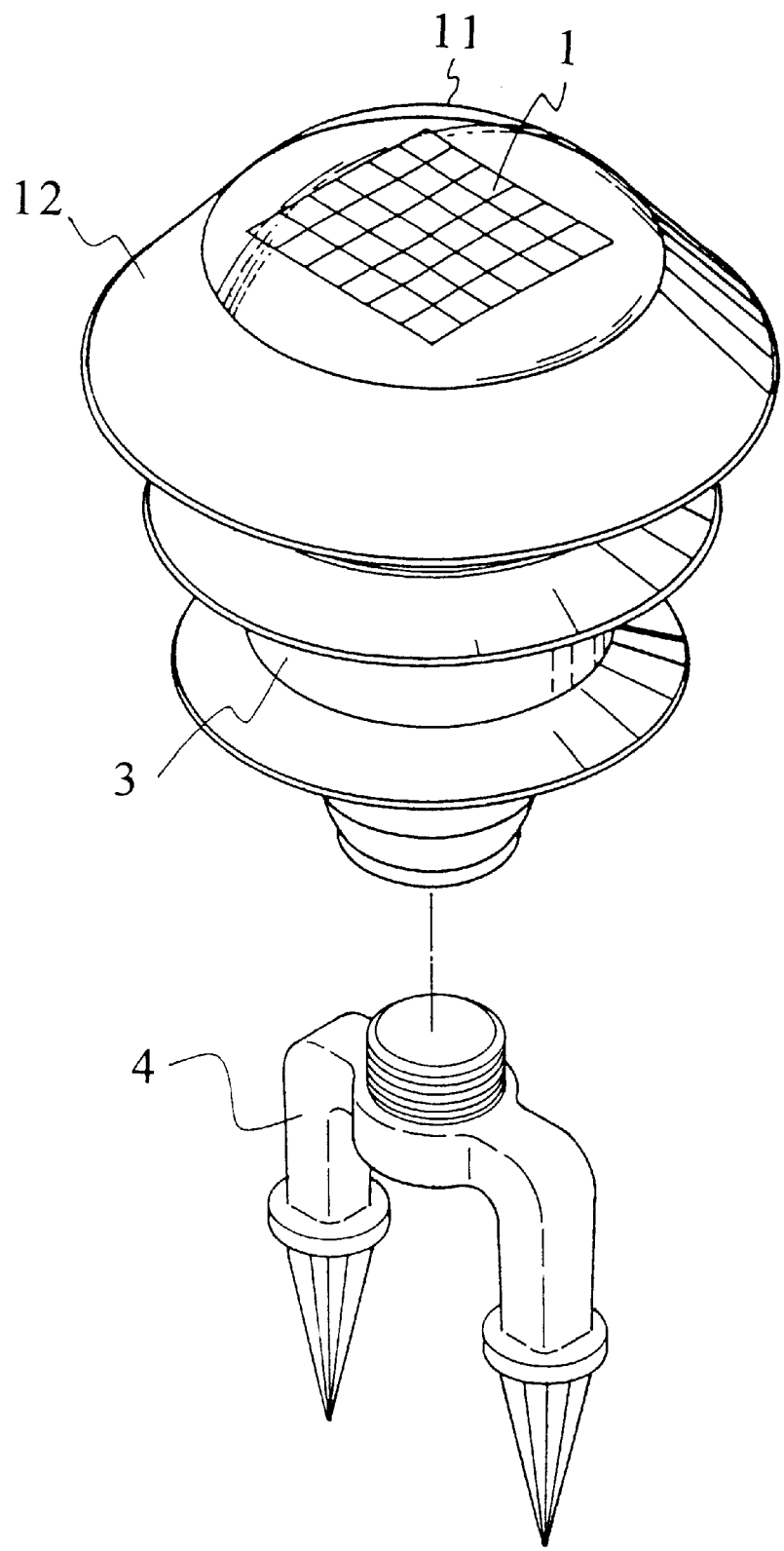
FIG. 13 is a view showing a preferred embodiment of the present invention with two tapered pillars provided at the bottom of the bulb.
Figure 14:
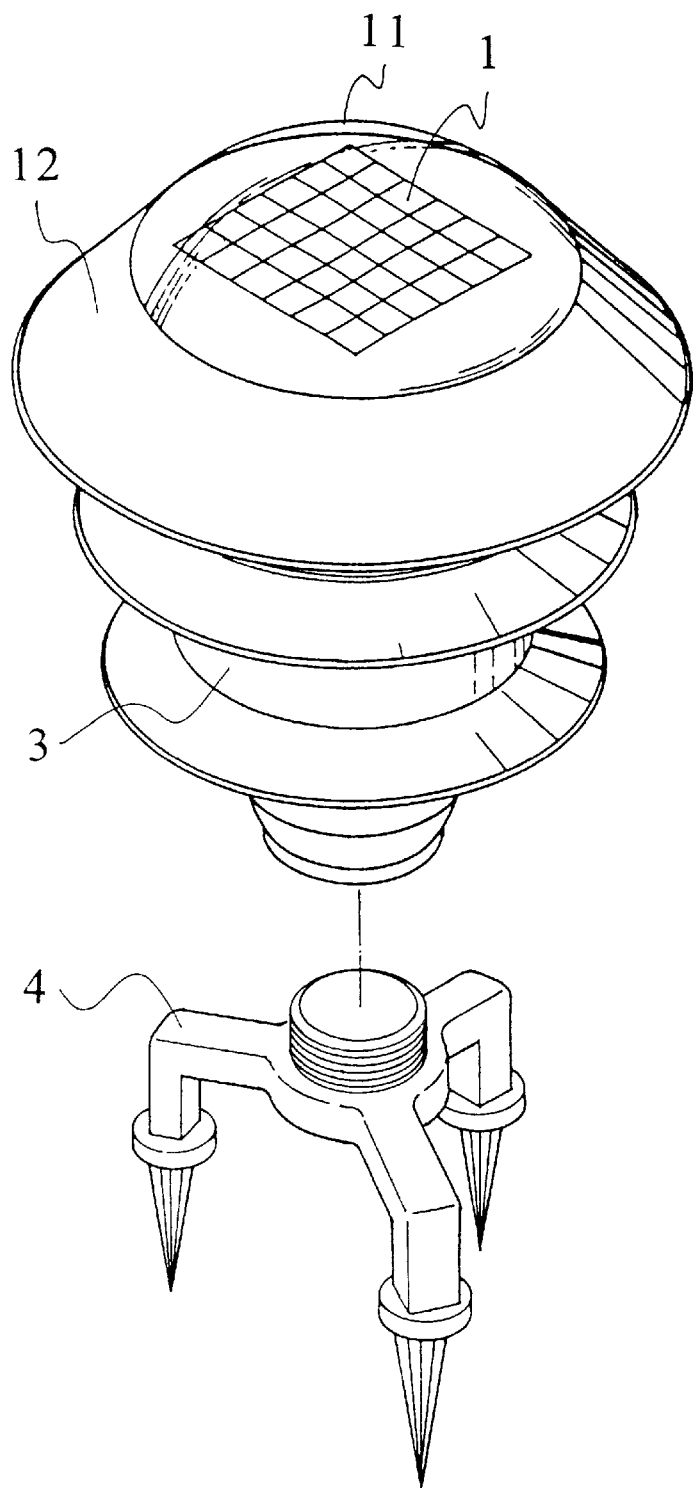
FIG. 14 is a view showing a preferred embodiment of the present invention with three tapered pillars provided at the bottom of the bulb.
Figure 15:
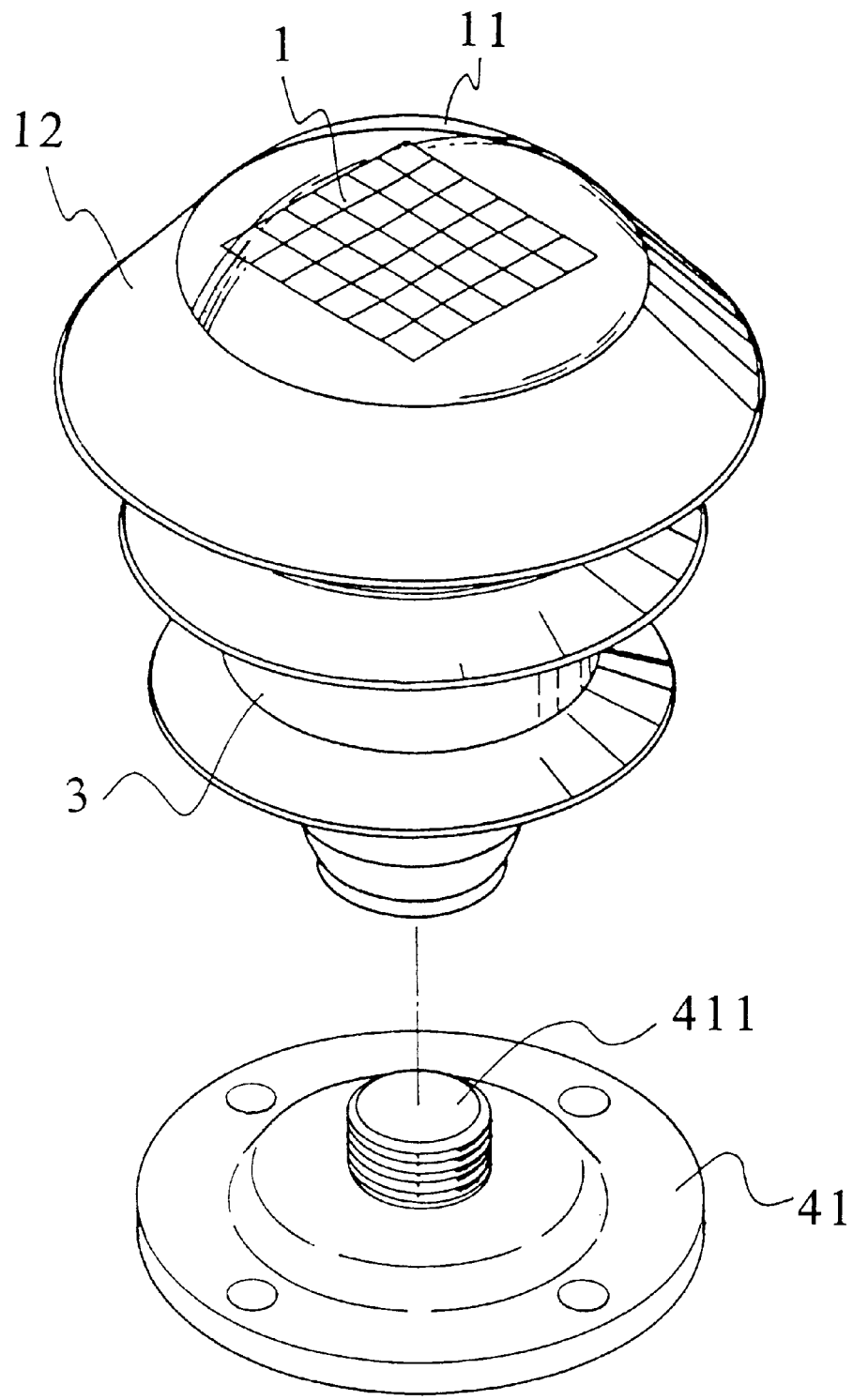
FIG. 15 is a view showing a preferred embodiment of the present invention with a fixed base provided at the bottom of the bulb.

Those additional preferred embodiments of the present invention as illustrated in FIGS. 12, 13 and 14 are adapted to various types of garden light. Wherein, the tapered footing member 4 separately provided at the bottom of the bulb 3 for planting the lighting fixture of the present invention into the ground as disclosed in those preferred embodiments disclosed above is incorporated to the bottom of the bulb 3. Said member 4 may be provided in the form of having one, two or three, or more than three sharp pedestals, which will be directly buried in the ground or simply erected on the ground. As the title of the present invention, a solar cell lighting fixture integrated with heat sink, suggests, a fixed base 41 in disk shape many be incorporated to the bottom of the bulb 3 with a locking pillar 411 at the center of the fixed base 41. Furthermore, the fixed base 41 may be fixed to any place, a body of mechanical equipment, a building, a mechanical equipment, or vehicles including automobile, sea vessel or aircraft.

To sum up, as a complete assembly, the solar cell lighting fixture integrated with heat sink is innovative either in its means, manipulation or spatial, configuration, and is significantly different from the structure of the prior art of integrated solar cell lighting fixtures. It can effectively protect circuits and battery devices contained within the light fixture from being damaged due to prolonged direct sunshine.

I claim:

1. A solar cell lighting fixture integrated with a heat sink comprising an upper lid having a solar cell panel at the top of the upper lid; a bulb; and a bulb housing that encloses said bulb, said heat sink comprising a support structure below said upper lid and above said bulb, and said support structure defining a space for the heat sink between said solar cell panel and said bulb;

wherein a charging circuit and a battery component are contained inside said bulb housing; and whereby said heat sink protects said charging circuit and battery component from being damaged or having their performance negatively affected by heat built up due to prolonged direct sunshine.

2. A solar cell lighting fixture integrated with a heat sink as claimed in claim 1, wherein said upper lid comprises a light transmission plate coupled to the solar cell panel; and said support structure includes at least one pillar and a fixing or locking means to secure said at least one pillar to the lighting fixture.

3. A solar cell lighting fixture integrated with a heat sink as claimed in claim 1, wherein said upper lid comprises a light transmission plate coupled to the solar cell panel; said support structure includes an insertion post provided on both sides of the bottom of the upper lid, a graded arc and a pivot hole provided at the terminal of each said insertion post and, a locking post provided on both sides of the upper end of the bulb, wherein the upper end of said locking post defines an arc to pivot the insertion post into said locking post so that the solar cell panel on the upper lid can be adjusted for an optimal area to face the sunlight; the insertion post and the locking post defining said space between said support structure and the bulb.

4. A solar cell lighting fixture integrated with a heat sink as claimed in claim 3, wherein the support structure further comprises a ring component and a groove provided at the upper edge of the bulb, and said locking post attaches to the ring component so that the solar cell panel can freely rotate by means of said ring component.

5. A solar cell lighting fixture integrated with a heat sink as claimed in claim 4, wherein said bulb housing further includes a tapered footing structure extending downward from the bulb, said tapered footing structure allowing the lighting fixture to be directly planted into the ground and providing an interior space to accommodate said battery component and said charging circuit.

6. A solar cell lighting fixture integrated with a heat sink as claimed in claim 1, wherein said support structure further comprises a universal ball joint and a corresponding ball pillar, said ball joint is provided at a lower casing of the solar cell panel and said ball pillar is inserted into the upper end of the bulb, wherein the ball joint rotates freely around the ball pillar.

7. A solar cell lighting fixture integrated with a heat sink as claimed in claim 6, wherein said bulb housing further includes a tapered footing structure extending downward from the bulb, said tapered footing allowing the lighting fixture to be directly planted into the ground, and providing an interior space to accommodate said battery component and said charging circuit.

8. A solar cell lighting fixture integrated with a heat sink as claimed in claim 1, wherein said support structure further comprises a net or porous support structure between the solar cell panel and the bulb to create said heat sink.

9. A solar cell lighting fixture integrated with a heat sink as claimed in claim 8, wherein said bulb housing further includes a footing structure extending downward from the bulb, said footing structure allowing the lighting fixture to be directly planted into the ground and providing an interior space to accommodate said battery component.

10. A solar cell lighting fixture integrated with a heat sink as claimed in claim 1, wherein said bulb housing further includes a tapered footing member having one, two, three, or more sharp pedestals separately provided at the bottom of the bulb housing, wherein said pedestals are planted, buried, or erected on the ground.

11. A solar cell lighting fixture integrated with a heat sink as claimed in claim 1, wherein, said bulb housing further comprises a fixed base with a locking pillar, said base being movably fixed.

12. A solar cell lighting fixture integrated with a heat sink as claimed in claim 1, wherein said bulb housing further includes a tapered footing structure extending downward from the bulb, said tapered footing allowing the lighting fixture to be directly planted into the ground, and providing an interior space to accommodate said battery component and said charging circuit.

13. A solar cell lighting fixture integrated with a heat sink as claimed in claim 2, wherein said bulb housing further includes a tapered footing structure extending downward from the bulb, said tapered footing allowing the lighting fixture to be directly planted into the ground, and providing an interior space to accommodate said battery component and said charging circuit.

* * * * *